Figure 1:
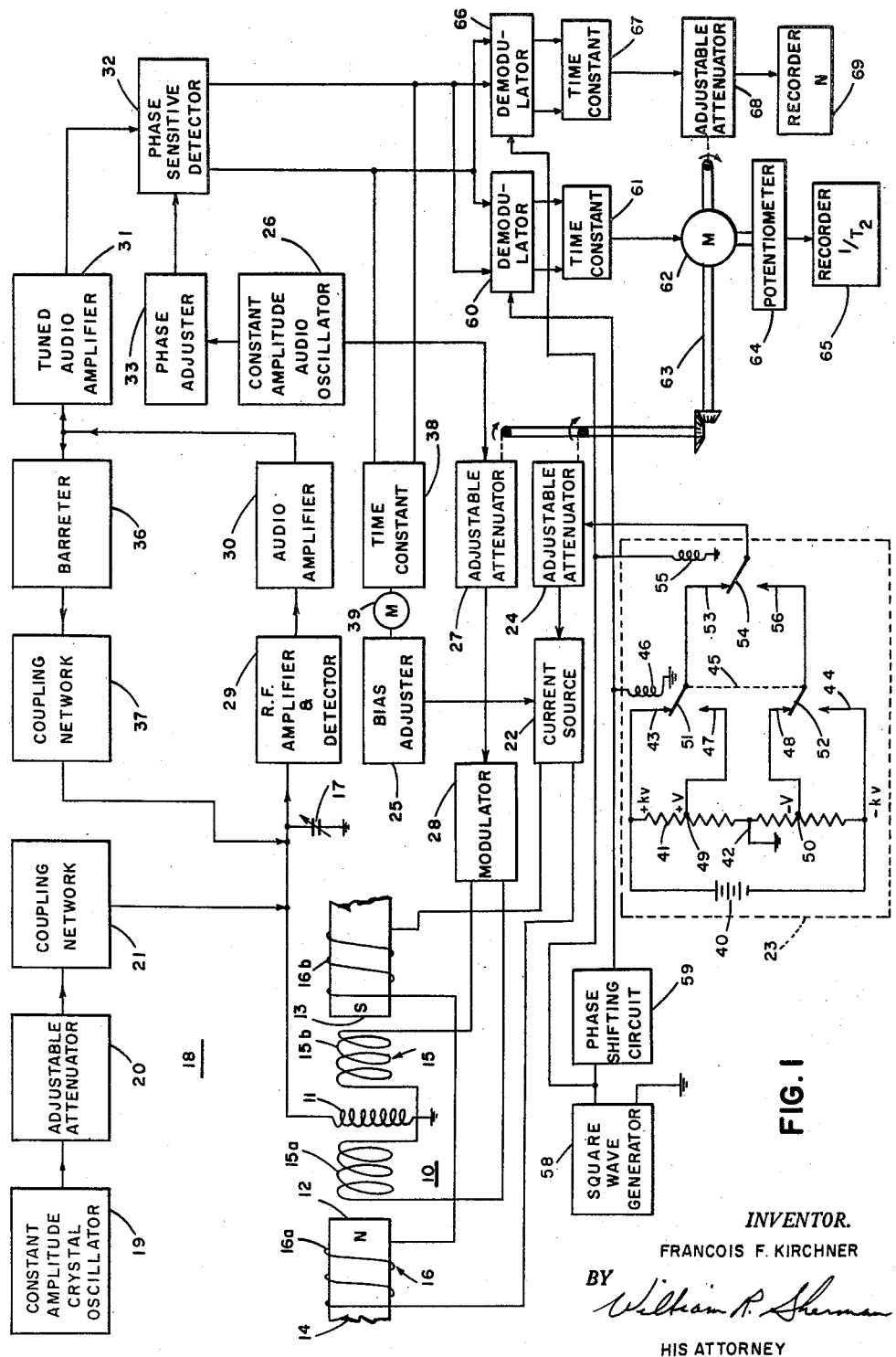

Nov. 4, 1958   F. F. KIRCHNER   2,859,403
MAGNETIC RESONANCE APPARATUS
Filed Sept. 14, 1956   4 Sheets-Sheet 1

INVENTOR.
FRANCOIS F. KIRCHNER
BY
HIS ATTORNEY

INVENTOR.
FRANCOIS F. KIRCHNER

INVENTOR.
FRANCOIS F. KIRCHNER
BY
HIS ATTORNEY

Nov. 4, 1958　　　F. F. KIRCHNER　　　2,859,403
MAGNETIC RESONANCE APPARATUS
Filed Sept. 14, 1956　　　　　　　　　　　　　4 Sheets-Sheet 4

INVENTOR.
FRANCOIS F. KIRCHNER
BY
William R. Sherman
HIS ATTORNEY

United States Patent Office 2,859,403
Patented Nov. 4, 1958

2,859,403

MAGNETIC RESONANCE APPARATUS

Francois F. Kirchner, Ridgefield, Conn., assignor, by mesne assignments, to Schlumberger Well Surveying Corporation, Houston, Tex., a corporation of Texas Application September 14, 1956, Serial No. 609,896

13 Claims. (Cl. 324—.5)

The present invention relates to magnetic resonance apparatus and more particularly to new and improved apparatus for obtaining indications of nuclear and other paramagnetic resonance phenomena.

Electron and nuclear resonances have been observed in the past by utilizing magnetic resonance spectrometers which respond to the absorption of energy from an alternating magnetic field by a paramagnetic sample under investigation. In general, the sample is placed in a unidirectional magnetic field and in the vicinity of a coil. Such coil is so disposed that an alternating magnetic field is generated within the sample perpendicularly to the unidirectional field when the coil is activated with a high frequency alternating current. The sample is passed through resonance by varying either the frequency of the alternating current which generates the alternating field or the intensity of the unidirectional field, since the resonance precession frequency of the paramagnetic particles in the sample is directly proportional to the intensity of the unidirectional field applied thereto. Resonance is observed as a result of the loading of the coil caused by absorption of energy at the resonance precession frequency.

The present magnetic resonance absorption spectrometers are, in general, extremely delicate instruments in which the high frequency activated detecting coil is included in a manually balanced R. F. bridge or in the tank circuit of an R. F. oscillator. Accordingly, a large amount of time, effort and skill are required to obtain measurements for each sample tested. Although a certain degree of success has been obtained under the closely supervised, carefully controlled conditions of research laboratories, these absorption spectrometers are essentially unsuited for industrial application where economical and reliable equipment must be used by relatively unskilled personnel and direct readings of the critical parameter are desired. Where simplification has been attempted, as by providing a relatively uncomplicated circuit for measuring variations in the effective Q of the detecting coil, the resulting low signal-to-noise ratio has made the equipment unreliable.

While a reliable, readily operated magnetic resonance absorption spectrometer has been constructed in accordance with the teachings of copending application Serial No. 552,403 filed December 12, 1955, by F. F. Kirchner and L. S. Jimerson, Jr., for "Magnetic Resonance Apparatus," the indications obtained with such apparatus are in the form of absorption characteristics of the paramagnetic sample being investigated. In certain applications, as in the determination of moisture content of processed materials such as starch, it would be desirable that a direct reading of moisture content be provided.

Accordingly, it is a primary object of the present invention to provide new and improved apparatus for obtaining direct indications of nuclear and other paramagnetic resonance phenomena with accuracy and simplicity of operation.

A further object of the present invention is to provide new and improved magnetic resonance absorption apparatus which provides a quantitative indication of the presence of particular paramagnetic particles in a sample.

Yet a further object of the present invention is to provide new and improved apparatus of the foregoing character which may be made extremely rugged and reliable for industrial applications, as well as self-adjusting.

These and other objects of the invention are attained by disposing an alternating field coil perpendicularly to a unidirectional field which is modulated by steps of intensity at a relatively low frequency. The coil is excited to produce an alternating field within a substance containing paramagnetic particles to promote resonance precession of the particles. A signal is derived having relatively low frequency variations which result from the interaction of the magnetic resonance and the modulation of the unidirectional field. These low frequency variations are utilized to control an adjustment of the stepped modulation in such a manner that the adjustment is proportional to the reciprocal of the relaxation time $T_2$. This same adjustment is applied to a demodulated version of the low frequency variations to obtain a signal which is a function of the number N of paramagnetic particles contributing to magnetic resonance of the sample.

In one form of the invention, the unidirectional field is modulated by first and second increments of intensity having a fixed ratio and recurring at a given rate and first phase, the polarity of the increments being reversed at the same rate but at a second phase. An audio frequency modulation is further impressed on the unidirectional field such that variations in the excitation of the tuned circuit detected with reference to the audio frequency correspond to the derivative curve of resonance absorption. The stepped increments are automatically adjusted to center the modulation with respect to the positive and negative peaks of the derivative curve such that the adjustment represents $1/T_2$.

In another embodiment, the unidirectional field is modulated at spaced time intervals through first increments of a given magnitude and alternate polarity and second increments of a different given magnitude and alternate polarity, the modulation being cyclic at a desired rate. The magnitude of the increments is adjusted in fixed proportion to obtain an adjustment representing $1/T_2$. This adjustment is employed in deriving a signal representing the number N of paramagnetic particles.

Figure 2:
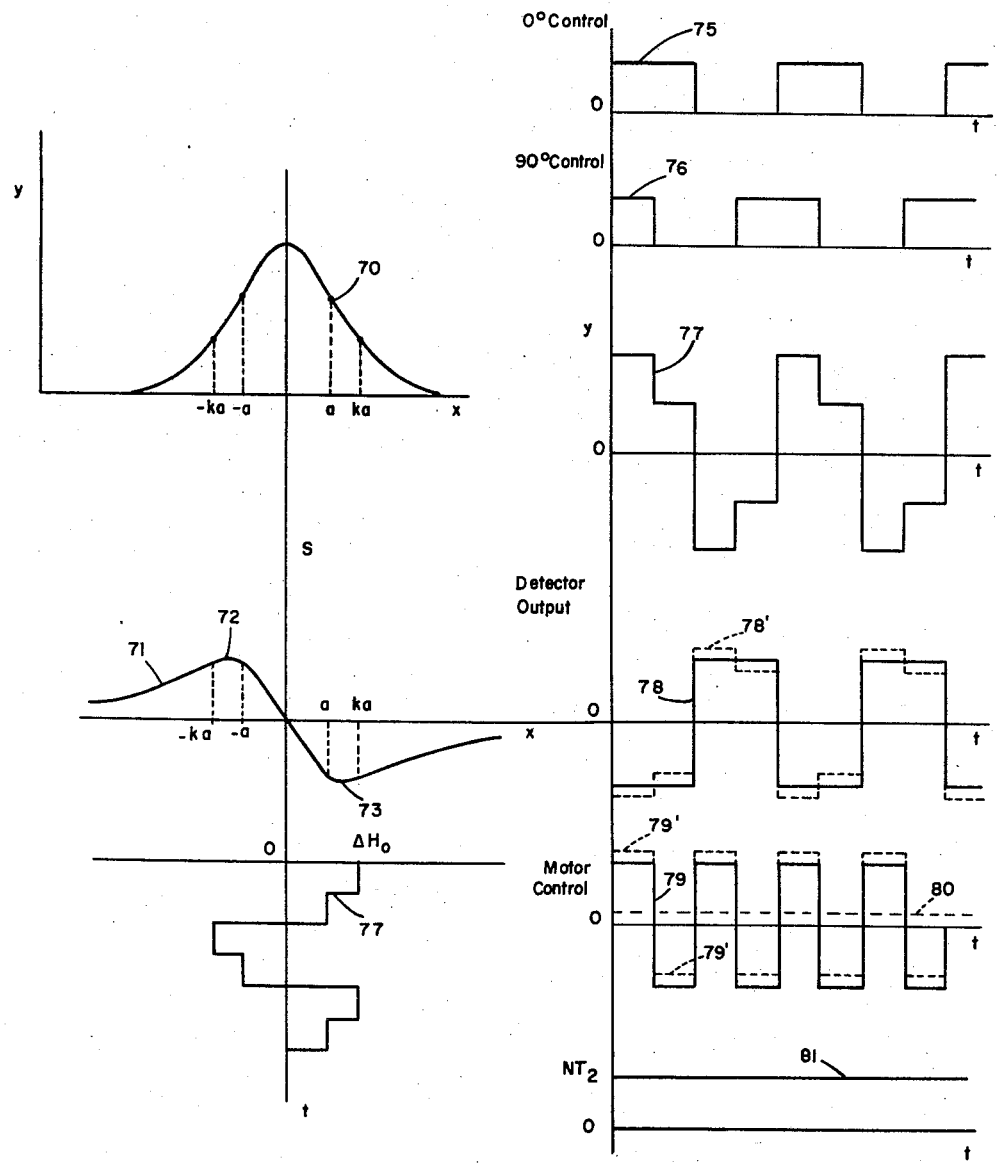
Figure 3:
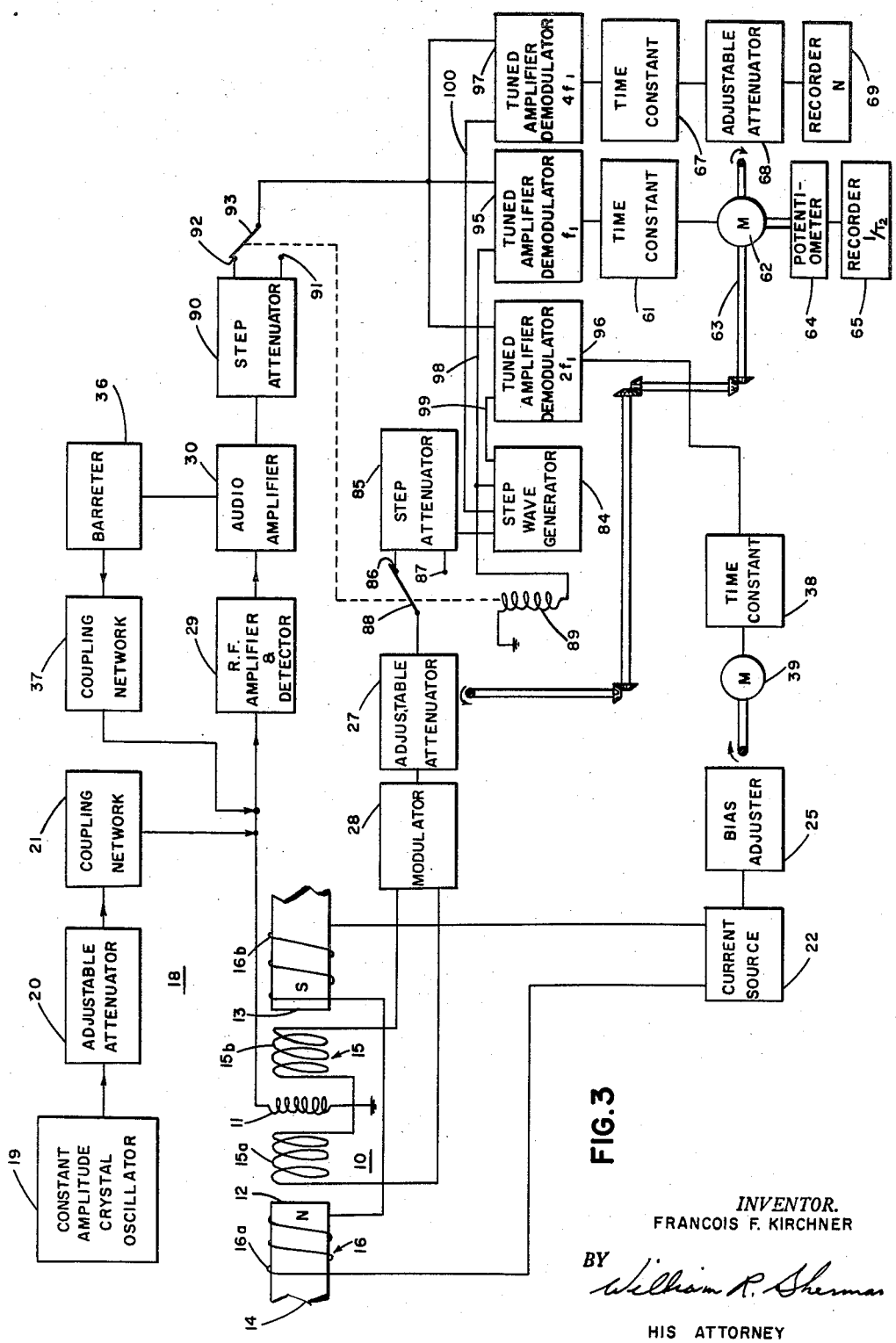
Figure 4:
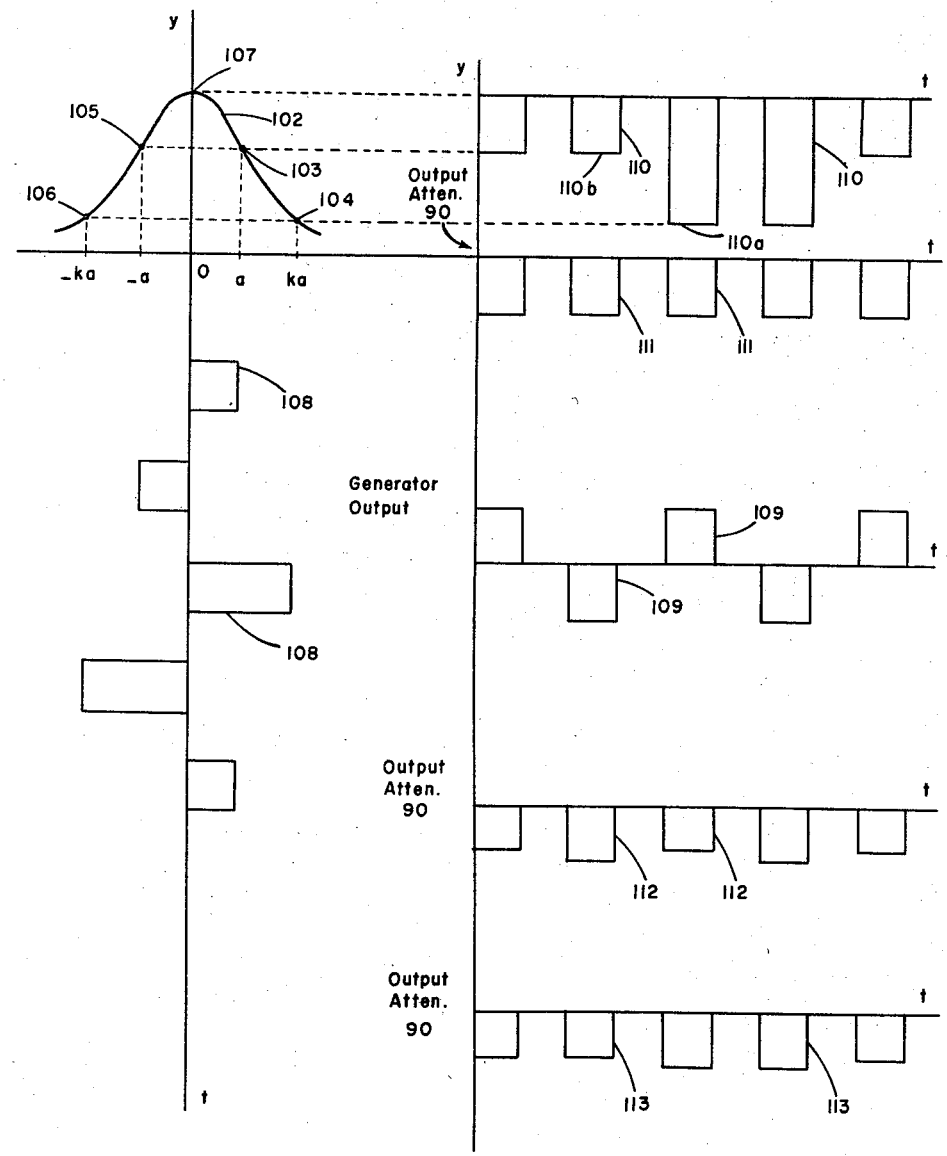

The invention will be more fully understood by reference to the accompanying drawings, in which:

Fig. 1 is a schematic representation of magnetic absorption apparatus constructed in accordance with the present invention;

Fig. 2 is a graphical representation of exemplary absorption characteristics and signals developed in the circuit shown in Fig. 1, to facilitate an explanation of its operation, Fig. 3 is a schematic representation of magnetic resonance absorption apparatus in accordance with another embodiment of the invention; and Fig. 4 is a graphical representation of exemplary absorption characteristics and signals developed in the circuit of Fig. 3, to facilitate an explanation of its operation.

In Fig. 1 is shown magnetic resonance absorption apparatus constructed in accordance with the invention including a sample testing portion 10 which may have a detailed construction as described in the above-mentioned application Serial No. 552,403. In general, sample testing portion 10 includes an R. F. coil 11 mounted perpendicularly between pole faces 12 and 13 of a permanent magnet 14. Coil 11 is arranged to receive a sample to be tested which may be in a suitable non-magnetic container. Also included between pole faces 12 and 13 is a modulation coil 15 including two separate coils 15a and 15b disposed on either side of coil 11 and extending in parallel with the unidirectional field of magnet 14 between the pole faces 12 and 13. A further modulation coil 16 is similarly aligned parallel to the unidirectional field and includes two separate windings 16a and 16b on the respective poles of magnet 14.

Coil 11 is electrically connected in parallel with a tuning capacitor 17 to form a tank circuit which may be tuned to the resonance precession frequency of specific paramagnetic particles in the sample. To excite the tank circuit, a generating circuit 18 is provided, which may suitably be of the type described in greater detail in the aforementioned application Serial No. 552,403. Generating circuit 18 includes a crystal controlled R. F. oscillator 19 having a constant intensity output, an adjustable, resistive attenuator 20 and a capacitive coupling network 21. The constant intensity output of the oscillator 19 is applied to the attenuator and the attenuated version of the R. F. signal is properly coupled to the tank circuit formed by coil 11 and capacitor 17. Capacitor 17 is adjusted so that the tank circuit is tuned to the frequency of oscillator 19.

The unidirectional magnetic field provided by magnet 14 is stepped at a slow rate through predetermined first and second increments by current of reversible polarity and correspondingly stepped amplitude which is passed through a modulating coil 16. To this end the coil 16 is connected across the output terminals of a current source 22 which may, for example, comprise a chopper-stabilized D. C. amplifier. A source of voltage increments having a ratio corresponding to the desired ratio of the first and second increments by which the magnetic field intensity is modulated is indicated generally at 23 and has connection through an adjustable attenuator 24 to the current source 22. Adjustable attenuator 24 may be a linear potentiometer arranged to be motor driven for automatic adjustment. The average intensity of the unidirectional field is also automatically adjusted, a feedback control circuit being provided for this purpose and including a bias adjustment circuit 25 coupled to current source 22. The coupling is such that the D. C. level of the current source output is varied in proportion to the bias signal so as to correct for any drift in field intensity, such as commonly arises with temperature variations in the vicinity of magnet 14. To minimize the temperature compensation required of the bias adjustment circuit, the magnet 14 is preferably insulated against thermal changes.

In addition to a stepped wave modulation of the unidirectional field, a further modulation of this magnetic field is provided at a higher rate by low frequency alternating current passing through modulation coil 15. A constant amplitude audio-frequency oscillator 26 has its output coupled through an adjustable attenuator 27 to a modulator 28 for providing this low frequency current. The adjustable attenuator 27 may be of a design similar to adjustable attenuator 24 and is ganged therewith for a corresponding motor adjustment. Modulator 28 may comprise a low frequency power amplifier having its terminals connected to the terminals of coil 15.

The R. F. voltage across coil 11 and capacitors 17 is applied to a tuned R. F. amplifier and detector 29 and the detected output is applied to two stages 30 and 31 of the low frequency amplification, stage 30 being a broadly tuned audio-amplifier and stage 31 being an audio-frequency amplifier which may be narrowly tuned to the frequency of oscillator 26. The output of amplifier 31 is supplied to a phase-sensitive detector 32 which is supplied with a sensitizing or reference signal from oscillator 26 via phase adjustor 33. From the output of detector 32 is derived a stepped wave signal having a frequency of alternation corresponding to that of modulating current from the current source 22 and a value varying in accordance with the resonance characteristics of the particular paramagnetic particles under investigation.

However, the amplitude level of the stepped wave output of detector 32 is also dependent upon the amplifier gain and thermal drift of the system. The system may be rendered essentially independent of variations in gain in a variety of ways, but preferably the negative feedback arrangement described in copending application Serial No. 552,401, filed December 12, 1955, by F. F. Kirchner for "Control Systems" is employed. As shown in Fig. 1, the low frequency output of audio-amplifier 30, which is 180° out of phase with the low frequency modulation on the R. F. signal at coil 11, is supplied to a degenerative feedback circuit including a so-called "barreter" 36. The barreter 36 has a resistance which is a function of the potential applied across it and likewise of the current passing through it. Network 37 serves to couple the barreter 36 in parallel with coil 11 and capacitor 17 so that variations in the barreter resistance tend to cancel variations in the tank circuit resistance and thereby to nullify the resistive component of modulation of the R. F. signal across the tank circuit. Accordingly, the output potential of audi-amplifier 30 accurately corresponds with the modulation component of the R. F. signal produced by changes in the effective resistance of the tank circuit and it is substantially independent of the gain of R. F. amplifier 29 and audio-amplifier 30. For a more detailed explanation, reference may be had to the aforementioned copending application Serial No. 552,401.

By suitably polarizing the phase-sensitive detector 32 with the reference signal from oscillator 26, its output corresponds with the resistive component of the modulation of the R. F. signal superimposed upon the stepped wave modulation. The effects of thermal drift are automatically compensated by supplying the output of detector 32 through a suitable time constant circuit 38 to motor 39 for controlling the bias adjustment circuit 25. The output of detector 32 is further utilized to control the adjustment of attenuators 24 and 27 and to provide a record of a parameter of the sample, such as the number N of particles contributing to the detected magnetic resonance. Before considering these further utilizations of the detector output signal, the details of the stepped voltage source 23 are appropriately brought out to furnish a basis for understanding the demodulation circuitry.

To provide a voltage wave which is stepped between two different values V and kV. and alternating in polarity at a desired rate, the source 23 may include a D.-C. supply such as battery 40 having its terminals connected across a potential divider 41 which has its midtap connected to ground at a point 42. One terminal of the potential divider 41 is thus maintained at a positive potential with respect to ground and the other terminal at a negative potential with respect to ground. These terminals are connected respectively to contacts 43 and 44 of a double-pole double-throw switch 45 actuated by solenoid 46. The other contacts 47, 48 of switch 45 are connected to intermediate tap points 49 and 50, respectively, of the potential divider 41. These tap points 49 and 50 are at the same potential V but the potential at tap 49 is positive and that at tap 50 is negative. The potential applied across the potential divider 41 by battery 40 is 2 kV where k is a constant of desired value greater than 1. As illustrated in Fig. 1, movable contacts 51, 52 of switch 45 are displaced from their normal position by energization of solenoid 46, so that contact 51 applies the potential +kV to one contact 53 of a switch 54 actuated by solenoid 55 and movable contact 52 applies a potential —V to the other contact 56 of this switch 54. Switch 54 is of the single-pole, double-throw type and has its movable contact connected with the input terminal of adjustable attenuator 24.

To obtain the desired voltage wave shape from source 23, switch 45 is reversed at a given rate and first phase to provide steps of voltage magnitude and switch 54 is reversed at the same given rate but at a second phase to reverse the polarity of the voltage wave applied to the adjustable attenuator 24 alternately at the given rate. This sequence of switching is conveniently obtained by energizing solenoid 55 directly from the output of a square wave generator 58 and energizing solenoid 46 by the output of the square wave generator 58 shifted, however, through a suitable leading or lagging phase angle, such as a leading phase angle of 90°, by phase shifting circuit 59.

The output wave of phase sensitive detector 32 is demodulated with reference to the first phase by applying the detector output to the input circuit of a demodulator 60 supplied with a reference signal from phase shifting circuit 59. When the modulation of the R. F. signal across coil 11 differs with switching between the potentials V and $kV$, the output of demodulator is a D.-C. signal of polarity determined by the respective amounts of R. F. signal modulation. This D.-C. signal is applied via an appropriate time constant circuit 61 to a servomotor 62 for causing the motor to turn in a direction determined by the polarity of the demodulator signal output. As will be explained hereafter, the motor 62 effects an adjustment by degenerative feedback serving to center the stepped wave modulation of the unidirectional field with respect to the peak derivatives of the absorption characteristic for the selected paramagnetic particles. To this end, shaft 63 of motor 62 is in driving connection with adjustable attenuator 24 to reset its adjustment at a value which results in a zero signal output from demodulator 60. At the same time, motor 62 effects a corresponding adjustment of attenuator 27 which is ganged with attenuator 24. The value of the adjustment setting is itself a significant parameter reflecting magnetic resonance properties of the sample and may be appropriately recorded as by coupling motor 62 to a potentiometer 64 to obtain an electrical signal which is supplied to a suitable recorder 65.

The stepped output wave of detector 32 is also supplied to a demodulator 66 which is supplied with a reference signal directly from square wave generator 58 having the given rate of frequency and of the second phase. Demodulator 66 effectively provides full wave rectification of the detector output and supplies the D. C. signal which is obtained through an appropriate time constant circuit 67 and adjustable attenuator 68 to a recorder 69. The adjustable attenuator 68 may be similar to attenuators 24 and 27 and, like them, is mechanically coupled to motor 62 so as to undergo a corresponding adjustment of its setting.

In operation, the oscillator 19 supplies R. F. current to the coil 11 with a constant amplitude and a constant frequency $f$. Assuming that the unidirectional field produced by permanent magnet 14 has a known intensity $H_0$, such as 2,000 gauss, in the absence of modulation, the frequency $f$ of oscillator 19 may be determined from the following relation:

(1) $$f = \gamma H_0 / 2\pi$$

where $\gamma$ is the gyromagnetic ratio of the particles under consideration and $H_0$ and $f$ are selected to produce magnetic resonance. If it is desired, for example, to measure proton resonance where $\gamma = 2.67 \times 10^4$ at a field intensity of 2,000 gauss, then from the foregoing relation, $f = 8.5$ mc./s. Hence, the frequency of the oscillator 19 is maintained constant at a value which is productive of resonance at the field intensity of the permanent magnet alone, but the value of the field intensity $H_0$ is actually modulated about the value which produces resonance, that is, for example, about the value of 2,000 gauss.

A typical absorption curve for paramagnetic particles is identified by numeral 70 in Fig. 2, being plotted as a function of field intensity and absorption $y$. The slope or derivative of curve 70 is plotted as curve 71 for various values of $x$, where $x$ represents the departure of field intensities $H_0$ from the intensity of the permanent magnet 14, and ordinate values of S, where S represents the slope of curve 70. The derivative curve 71 is seen to have two peaks 72, 73 which are respectively of positive and negative polarity and spaced a distance representing the "line width" of the resonance "line" or curve 70 and thus proportional to the reciprocal of the resonance relaxation time $T_2$. Analytically, the curve 71 is expressed by the approximate relationship:

(2) $$S(x) = \frac{NT_2^3 x}{(1 + T_2^2 x^2)^2} M$$

where M represents the amplitude of the low frequency modulation developed in coil 15.

Broadly speaking, the degenerative feedback applied to adjustable attenuator 24 varies the step wave modulation of the unidirectional field so as to center the stepped increments with respect to the peaks 72, 73 of the derivative curve 71, while the feedback loop including bias control 25 serves to center the modulation with respect to the absorption peak for curve 70. By applying the reference signals, represented by square wave trains 75 and 76, respectively, in Fig. 2, to the source 22, a stepped voltage wave represented at 77 is derived. This stepped wave 77 alternates in polarity in phase with the square wave train 75 and undergoes a step in amplitude in phase with square wave 76. It will be appreciated, of course, that the sequence in which the steps in amplitude are produced may be reversed to alter the shape of wave 77 without altering its utility. Current source 22 supplies current to the modulating winding 16 having a wave shape corresponding to wave 77 but variable in amplitude in accordance with the setting of attenuator 24. When the voltage applied to the attenuator 24 has its lesser value V, a change $x$ in the intensity of the undirectional field is produced having a given value $a$. For the larger potential $kV$ the incremental change in field intensity is correspondingly $ka$, the value $k$ being fixed, as noted above. When the setting of attenuator 24 is correct, the peak 73 in the derivative curve 71 occurs midway between the incremental field intensities $a$ and $ka$ whereupon $S(a)$ is equal to $S(ka)$. The positive peak 72 is similarly centered between the negative incremental values of $-a$ and $-ka$, so that the ordinate S has the same value for each of these incremental values of field intensity.

The output of phase-sensitive detector 32 represents the derivative value S of the absorption curve 70 as determined by the modulating signal applied to coil 16. Hence, at the detector output there is derived a stepped or square wave signal represented at 78 in Fig. 2 which alternates at the frequency and phase of square wave 75 supplied directly by square wave generator 58 and is susceptible to steps in amplitude at the phase of square wave 76 derived from phase shifting circuit 59. However, as illustrated, output wave 78 is a pure square wave when the incremental steps by which the unidirectional field is modulated are centered with respect to the field intensities at the two peaks 72, 73 of the derivative curves 71. The average value of square wave 78 is zero and, as such does not alter the setting of bias control 25. It will be appreciated that, should the stepped increments by which the field intensity is modulated not be centered with respect to the field intensity at which the resonance peak occurs, square wave 78 is distorted to have an average D. C. value with a polarity corresponding to the sense in which the modulation applied to coil 16 is shifted with respect to the resonant peak. Such a D. C. signal is operative through the bias control 25 to adjust the D. C. level of the current source output applied to coil 16 in a sense corresponding with the polarity so as to restore the modulation to symmetry with respect to the resonant peak.

When the stepped modulating wave 77 is not of correct amplitude so as to be centered on the peaks 72, 73, the square wave 78 is distorted to have the stepped form 78' indicated in dotted lines. By demodulating the detector output wave 78 or 78' in demodulator 60 with reference to a square wave 76 of first phase, a double frequency square wave 79 or 79' is obtained. The double frequency square wave 79, which corresponds with centering of the stepped modulation on the peaks 72, 73 has an average value of zero and hence does not energize motor 62 to adjust the setting of attenuators 24, 27 or 68. However, with a stepped detector output wave 78', the double frequency square wave 79' is obtained having an average D. C. value indicated by the dotted line 80 in Fig. 2 and serving to energize motor 62 to adjust attenuator 24 in the correct sense for degeneratively reducing this D. C. value toward zero. Since the positioning of motor shaft 63 determines the magnitude of the value $a$ by which coil 16 serves to modulate the unidirectional field and the value $a$ is proportional to the line width of the absorption characteristic 70, it follows that the position of shaft 63 represents $1/T_2$, or the reciprocal of the relaxation time for the paramagnetic particles under investigation. Indications of the setting of motor shaft 63 are obtained with recorder 65.

Because the adjustment of attenuator 24 afforded by motor 62 centers the stepped wave modulation on the peaks 72, 73, the resulting equality of $S(a)$ and $S(ka)$ establishes the relationship:

$$(3) \qquad \frac{NT_2^3aM}{(1+T_2^2a^2)^2} = \frac{kNT_2^3aM}{(1+k^2T_2^2a^2)^2}$$

which may be solved to yield $$(4) \qquad a = \frac{C}{T_2}$$

where C is a constant. By rendering the modulation M proportional to $a$, that is, variable inversely with the relaxation time $T_2$, the following expression holds:

$$(5) \qquad S(a) = S(ka) \propto NT_2$$

This relationship is achieved by ganging attenuator 27 with attenuator 24 so that modulating current supplied to coil 15 varies as a reciprocal of the relaxation time $T_2$. To recover a signal proportional to $S(a)$ as given by expression 5 above, the detector output wave 78 is demodulated by demodulator 66 with reference to the square wave 75 of a second phase so as effectively to be subjected to full wave rectification. When the modulation is correctly centered on the peaks 72, 73 a substantially steady D. C. signal represented by line 81 in Fig. 2 is derived from time constant circuit 67 connected with the output of demodulator 66. By supplying this signal $NT_2$ to the attenuator 68 which is adjusted by motor 62 as the reciprocal of $T_2$, a signal is obtained for application to recorder 69 which is proportional to N, that is, to the number of paramagnetic particles contributing to the absorption characteristic of the sample at the frequency of oscillator 19.

By employing a sample of known amount, the number N of particles is directly proportional to the percentage that such particles constitute of the whole sample. In one application, a sample of starch may be placed in coil 11 and a reading on recorder obtained which represents the number of protons and corresponds to the percentage moisture content. Since a single number is obtained for a given sample representing the quantity of paramagnetic particles present, a simple meter or other indicating device may be substituted for recorder 69. The indicating device may conveniently be calibrated by inserting a standard sample in the sample receiving coil 11 and noting the indication obtained.

Referring now to Fig. 3, there is shown another and somewhat simpler embodiment of the invention. Like reference numerals are employed to designate parts similar to those of Fig. 1. In this embodiment, current source 22 is controlled solely by motor 39. The motor is in driving connection with bias adjustment circuit 25 for controlling the bias signal degeneratively to center modulation of the unidirectional field with respect to the resonance peak of the absorption characteristic.

To modulate the unidirectional field by suitably recurring steps of intensity, a step wave generator 84 is employed which may suitably comprise a plurality of square wave generators having their outputs related in frequency as the fundamental, second, fourth and eighth harmonics. These outputs may be combined in any conventional way to derive a stepped wave signal comprising steps of equal magnitude and duration alternating in polarity at twice the fundamental frequency $f$ and spaced by time intervals of like duration. The output wave signal of the step wave generator 84 is coupled through a step attenuator 85 to terminals 86, 87 of a single-pole, double-throw switch 88 which is connected to the input of the adjustable attenuator 27. Step attenuator 85 may simply be a potentiometer having fixed taps connected to terminals 86, 87 to apply potentials thereto, the ratio of which equals the constant $k$. Energization of a solenoid 89 by generator 84 reverses switch 88 at the fundamental frequency of the step wave output of the generator. This frequency may suitably be in the audio range such as, for example, 40 cycles per second. The alternating stepped wave having a change in amplitude at the fundamental frequency is supplied by adjustable attenuator 27 to modulator 28 so that the modulation coil 15 is correspondingly energized.

In lieu of the tuned audio amplifier 31 (Fig. 1), there is coupled to the output of audio amplifier 30 (Fig. 3) a step attenuator 90 which may be similar to step attenuator 85 but affording a potential ratio equal to another constant $h$. Step attenuator 90 supplies the signal detected in coil 11 to terminals 91, 92 of a switch 93 similar to switch 88 and operated in common therewith by solenoid 89. The input of the attenuator may suitably be clamped to ground, as by a diode clamp circuit, to obtain a unidirectional signal deviating from zero in accordance with the departure from maximum absorption.

The detected signal which is derived from step attenuator 90 is supplied in common to the inputs of three tuned amplifier-demodulator circuits 95, 96 and 97 which may include phase-sensitive detector circuits of conventional design for demodulating the input signals. Circuit 95 is supplied with a reference signal via conductor 98 from step wave generator 84 at the fundamental frequency $f_1$. Circuit 96 is supplied via conductor 99 with a second harmonic reference signal at the frequency $2f_1$, while circuit 97 is supplied via conductor 100 with a fourth harmonic reference signal at frequency $4f_1$. The output of amplifier-demodulator circuit 96 is coupled to the input of time constant circuit 38 to control the bias adjustment through motor 39. The output of amplifier-demodulator circuit 95 is supplied to the input of time constant circuit 61, while the output of amplifier-demodulator circuit 97 is supplied to the input of time constant circuit 67. As in the embodiment of Fig. 1, motor 62 is coupled by drive connection 63 to the adjustable attenuators 27 and 68 but the adjustable attenuator 24 of Fig. 1 is not here employed. In other respects, the apparatus of Fig. 3 may be arranged similarly to the apparatus of Fig. 1.

In operation, the coil 11 is energized just as it was in the apparatus of Fig. 1. Assuming that paramagnetic particles are present in the sample within coil 11 having a resonance absorption characteristic typified by curve 102 of Fig. 4, the unidirectional field is modulated through deviations $x$ in the field strength $H_0$ of permanent magnet 14 through positive steps $a$ and $ka$ and negative steps $-a$ and $-ka$ so that values $y$ of absorption are derived corresponding to points 103—106 on the absorption curve 102. To provide a reference, the modulation is intermittently reduced to zero at which time a $y$ value corresponding to point 107 on the curve 102 is also obtained.

To derive a signal representing the reciprocal of the relaxation time $T_2$, the stepped modulation 108 of the unidirectional field is centered on the resonance peak so that point 107 of curve 102 corresponds with its maximum $y$ value. Then, the value of the modulation $a$ is adjusted for a given attenuation constant $k$ so that the ratio of the $y$ values at points 103 and 104 (or 105 and 106) relative to point 107 equals a given constant $h$. The magnitude of the modulation $a$ is then proportional to the reciprocal of the relaxation time $T_2$. Expressed mathematically, the absorption curve 102 may be represented by the equation:

$$(6) \qquad y(x) = \frac{NT_2}{1 + T_2^2 X^2}$$

where $N$ is again the number of paramagnetic particles contributing to resonance absorption. Assuming that the modulation is centered with respect to the resonance peak 107, the equality is established:

$$(7) \qquad \frac{y(0) - y(ka)}{y(0) - y(a)} = h$$

Solving Expressions 6 and 7, the modulation $a$ is found to be proportional to $1/T_2$.

The significance of Equation 7 may be understood by first assuming that the apparatus is in correct adjustment. The stepped output wave of generator 84 has a wave form represented at 109 in Fig. 4 as an alternating square wave having a frequency $2_1$ of polarity alternations, returning to zero intermediate each alternation. This step wave 109 is stepped in amplitude at the fundamental frequency $f_1$ between the absolute values $a$ and $ka$ by attenuator 85. When the modulation $a$ and, hence, $ka$ is properly adjusted by atenuator 27 and is centered by bias adjuster 25, the absorption is represented by the signal output of audio amplifier 30 having the time variation with respect to ground of step wave 110 shown in Fig. 4. The ground level to which the wave 110 is clamped corresponds with $y(0)$ in Expression 7, while the amplitudes of peaks 110$a$ and 110$b$ correspond, respectively, with $y(ka)$ and $y(a)$. The amplitude of peaks 110$a$ is a constant $h$ times as great as the amplitude of the lesser peaks 110$b$, when properly adjusted. The attenuator 90, in attenuating each of the peaks 110$a$ relative to the peaks 110$b$ by this constant factor $h$, then supplies a true square wave 111, the frequency of which is the fourth harmonic or $4f_1$, to represent the detected variations in resonance absorption.

To ensure that the detected variations in resonance absorption are free of the effects of off-centered modulation, the output of the step attenuator 90 is supplied to the tuned amplifier-demodulator 96 which is sensitized at the second harmonic frequency $2f_1$. If the modulation is off-center with respect to the resonance peak, the signal supplied to the demodulator 96 is a step wave 112 shown in Fig. 4, having a second-harmonic component arising from the off-centered modulation. While the wave 111 corresponding to properly centered modulation has a zero second-harmonic component, the presence of a second-harmonic in the wave 112 results in an output from demodulator 96 which is a D.-C. signal of a polarity corresponding to the sense in which the modulation deviates from proper centering. Thus, a D.-C. signal is derived from time constant circuit 38 serving to energize motor 39 in the proper sense to correct the bias adjustment of current source 22 for properly centered modulation.

To ensure that the Expression 7 is satisfied, the step attenuator 90 has an attenuation ratio of $h$ and attenuates strongly when the step attenuator 85 attenuates weakly, and vice versa. That is to say, attenuator 90 has its output level switched in synchronism with the output level of attenuator 85 but with a reversed relationship of relative values. Accordingly, since the output of attenuator 85 is more strongly attenuated in the first half cycle to produce a relatively slight change in absorption between points 103 and 107 whereas the slight attenuation in the second half cycle results in a strong variation between points 104 and 107, such slight variation in the first half cycle is only slightly attenuated by attenuator 90, whereas the stronger variation in the second half cycle is more strongly attenuated by step attenuator 90. Hence the step wave 113 supplied to the amplifier-demodulator 95 represents the form of the output wave 111 when the amplitude of the modulation is not correctly adjusted. The wave 113 is seen to have a component of fundamental frequency $f_1$ representing the maladjustment. Since the demodulator 95 is sensitized at the fundamental frequency $f_1$, its output is a D. C. signal, the polarity of which corresponds to the sense of the required adjustment in the modulation amplitude. This D. C. output of demodulator 95 is supplied to time constant circuit 61 for degeneratively controlling motor 62.

Assuming that the D. C. output of circuit 61 has a value other than zero, motor 62 is energized to drive adjustable attenuator 27 in a direction tending to reduce the output towards zero. In accordance with Expression 7, the output of the time constant circuit 61 is zero only when the modulation $a$ has been adjusted by attenuator 27 to be proportional to the reciprocal of the relaxation time. This adjustment is is thus automatically effected.

At the same time, adjustable attenuator 68 is also set at a value proportional to the reciprocal of the relaxation time. Considering now the output from amplifier-demodulator 97, sensitization of this demodulator by a reference signal at frequency $4f_1$, that is, by a fourth harmonic signal results in a D. C. output corresponding to the wave form 111 of Fig. 4. As a result, the output wave from demodulator 97 has a D. C. level, the average value of which is derived from time constant circuit 67 for application to adjustable attenuator 68. This average D. C. value is proportional to $NT_2$, which is the product of the number $N$ of paramagnetic particles participating in resonance absorption, and the relaxation time $T_2$. Since attenuator 68 is adjusted inversely as the relaxation time $T_2$, its output, which is supplied to recorder 69, varies with and represents the number $N$ of paramagnetic particles. The desired indications of the number of participating paramagnetic particles is thus obtained.

It will be appreciated that the step wave generator 84 may supply the steps of modulation in a different sequence by an appropriate arrangement without impairing the recorded values of $N$ and $1/T_2$. Where mechanical switches are schematically illustrated, electronic switches such as conventional diode switches may be employed.

It will be understood that the present invention may be utilized for detecting resonance and for controlling magnetic fields with other types of magnetic resonance apparatus. For example, other types of absorption spectrometers may be used such as, for example, those in which coil 13 is included in an R. F. bridge or those in which coil 13 is included as a portion of the tank circuit of the R. F. oscillator. In addition, other types of spectrometers such as the so-called induction spectrometer in which two coils at right angles to each other and to the unidirectional magnetic field are employed, to one of which the oscillator is connected, to the other of which is connected the detector circuit.

While representative embodiments have been illustrated

I claim:

1. In magnetic resonance apparatus, the combination comprising means for generating a unidirectional magnetic field, a tank circuit including a sample receiving coil disposed perpendicularly to said magnetic field and tunable to the resonance precession frequency of particular paramagnetic particles in the sample, adjustable modulating means for stepping the unidirectional magnetic field through first and second increments having a fixed ratio and an alternating polarity, means for passing a substantially constant intensity alternating R. F. current through said coil at substantially the reasonable precession freqency, first feedback circuit means responsive to the modulation of the R. F. potential across said coil for centering the modulation of said unidirectional field with respect to the resonance peak of said paramagnetic particles, second feedback circuit means responsive to the modulation of said R. F. potential for adjusting said modulating means inversely as the relaxation time of the paramagnetic particles, and means adjustable by said second feedback circuit means and responsive to modulation of said R. F. potential for producing an indication characteristic of the particular paramagnetic particles.

2. In magnetic resonance apparatus, the combination comprising means for generating a unidirectional magnetic field, a tank circuit including a sample receiving coil disposed perpendicularly to said magnetic field and tunable to the resonance precession frequency of particular paramagnetic particles in the sample, adjustable modulating means for stepping the unidirectional magnetic field through first and second increments having a fixed ratio and alternating polarity, means for passing a substantially constant intensity alternating R. F. current through said coil at substantially the resonance precession frequency, first feedback circuit means responsive to the modulation of the R. F. potential across said coil arising from alternations in polarity for centering the modulation of said unidirectional field with respect to the resonance peak of said paramagnetic particles, second feedback circuit means responsive to the modulation of said R. F. potential produced by the ratio of amplitudes of said first and second increments for adjusting said modulating means inversely as the relaxation time of the paramagnetic particles, and means adjustable by said second feedback circuit means and responsive to the modulation of said R. F. potential for producing an indication representing the number of paramagnetic particles contributing to resonance absorption.

3. In magnetic resonance apparatus, the combination comprising means for generating a unidirectional magnetic field, a tank circuit including a sample receiving coil disposed perpendicularly to said magnetic field and tunable to the resonance precession frequency of particular paramagnetic particles in the sample, adjustable modulating means for stepping the unidirectional magnetic field through first and second increments having a fixed ratio at a given rate and a first phase and reversing the polarity of said increments at said given rate and a second phase, means for passing a substantially constant intensity alternating R. F. current through said coil at substantially the resonance precession frequency, first feedback circuit means responsive to the modulation of the R. F. potential across said coil for centering the modulation of said unidirectional field with respect to the resonance peak of said paramagnetic particles, second feedback circuit means responsive to the modulation of said R. F. potential for adjusting said modulating means inversely as the relaxation time of the paramagnetic particles to center the first and second increments with respect to the positive and negative peaks of the derivative of the resonance absorption with respect to magnetic field intensity, and means adjustable by said second feedback circuit and responsive to the modulation of said R. F. potential for producing an indication characteristic of the particular paramagnetic particles.

4. In magnetic resonance apparatus, the combination comprising means for generating a unidirectional magnetic field, a tank circuit including a sample receiving coil disposed perpendicularly to said magnetic field and tunable to the resonance precession frequency of particular paramagnetic particles in the sample, means for passing a substantially constant intensity alternating R. F. current through said coil at substantially the resonance precession frequency, first adjustable modulating means for varying the magnetic field intensity at a low frequency to modulate the R. F. potential across said coil, second adjustable modulating means for stepping the magnetic field intensity through first and second increments having a fixed ratio at a given rate and first phase and for reversing the polarity of said increments at said given rate and a second phase, first feedback circuit means responsive to the modulation of the R. F. potential for adjusting said second modulating means to center the modulation of said magnetic field intensity with respect to the resonance peak of said paramagnetic particles, second feedback circuit means responsive to the modulation of the R. F. potential for adjusting said second modulating means to center the first and second increments with respect to the maximum values of the derivative of the resonance absorption with respect to magnetic field intensity and for correspondingly adjusting said first demodulating means, and means adjustable by said second feedback circuit means and responsive to the modulation of said R. F. potential for producing an indication representing the quantity of paramagnetic particles in the sample.

5. In magnetic resonance apparatus, the combination comprising means for generating a unidirectional magnetic field, a tank circuit including a sample receiving coil disposed perpendicularly to said magnetic field and tunable to the resonance precession frequency of particular paramagnetic particles in the sample, means for passing a substantially constant intensity alternating R. F. current through said coil at the resonance precession frequency, first modulating means for adjustably varying the magnetic field intensity at a low frequency, second modulating means for stepping the magnetic field intensity through first and second increments having a fixed ratio at a given frequency lower than said low frequency and at a first phase and reversing the polarity of said increments at a second phase, said second modulating means being adjustable to vary the magnitude of said increments and their average D.-C. value, detecting means coupled to said tank circuit and sensitive to said low frequency modulation for producing a step wave signal alternating at said given frequency and second phase, demodulating means for rectifying said step wave signal at said given frequency and first phase to derive a control signal, first degenerative feedback means responsive to said control signal for adjusting said first and second modulating means to reduce said control signal substantially to zero, second degenerative feedback means responsive to said step wave signal for adjusting said second modulating means to reduce the average value of said step wave signal substantially to zero, and means responsive to a demodulated version of said step wave signal for providing indications which are characteristic of the particular paramagnetic particles.

6. In magnetic resonance apparatus, the combination as defined in claim 5, including second demodulating means for rectifying said step wave signal at said given frequency and second phase to derive a measure signal, and means adjustable by said first feedback means for attenuating said measure signal, said indications corresponding to said adjustably attenuated measure signal.

7. In magnetic resonance apparatus, the combination as defined in claim 5, wherein said second phase is in phase quadrature with said first phase.

8. In magnetic resonance apparatus, the combination as defined in claim 6, which includes means for providing indications of the adjustment afforded by said first feedback means.

9. In magnetic resonance apparatus, the combination comprising means for generating a unidirectional magnetic field, a tank circuit including a sample receiving coil disposed perpendicularly to said magnetic field and tunable to the resonance precession frequency of particular paramagnetic particles in the sample, adjustable modulating means for stepping the unidirectional magnetic field at a given rate through first and second increments of alternating polarity having a fixed ratio, means for passing a substantially constant intensity alternating R. F. current through said coil at substantially the resonance precession frequency, means for modifying the modulation of the R. F. potential across said coil in steps at said given rate by factors having a constant ratio applied in opposing sequence with respect to said increments, first feedback circuit means responsive to the modified modulation of the R. F. potential across the coil for centering the modulation of said unidirectional field with respect to the resonance peak of said paramagnetic particles, second feedback circuit means responsive to the modified modulation of said R. F. potential for adjusting said modulating means inversely as the relaxation time of the paramagnetic particles, and means adjustable by said second feedback circuit means and responsive to the modified modulation of said R. F. potential for producing an indication characteristic of the particular paramagnetic particles.

10. In magnetic resonance apparatus, the combination comprising means for generating a unidirectional magnetic field, a tank circuit including a sample receiving coil disposed perpendicularly to said magnetic field and tunable to the resonance precession frequency of particular paramagnetic particles in the sample, adjustable modulating means for steeping the unidirectional magnetic field at a given rate through first and second increments of alternating polarity having a fixed ratio of amplitudes measured with reference to alternate periods of zero modulation, means for passing a substantially constant intensity alternating R. F. current through said coil at substantially the resonance precession frequency, means for modifying the modulation of the R. F. potential across said coil by stepped attenuations having a given ratio applied in opposing sequence with respect to said increments, first feedback circuit means responsive to the modified modulation of the R. F. potential across the coil for centering the modulation of said unidirectional field with respect to the resonance peak of said paramagnetic particles, second feedback circuit means responsive to the modified modulation of said R. F. potential for adjusting said modulating means so that the modified modulation produced by said first increments equals the modified modulation produced by said second increments, and means adjustable correspondingly by said second feedback circuit means and responsive to the modified modulation of said R. F. potential for producing an indication characteristic of the quantity of paramagnetic particles.

11. Magnetic resonance apparatus, as defined in claim 9, wherein said first and second feedback circuit means include, respectively, first and second demodulating means sensitized at the second harmonic and fundamental, respectively, of the frequency at which said unidirectional magnetic field is stepped.

12. In magnetic resonance apparatus, the combination comprising means for applying a unidirectional magnetic field to a sample of material, means for applying an alternating magnetic field perpendicularly to said unidirectional magnetic field through said sample to produce a signal dependent upon the paramagnetic resonance properties of said sample, adjustable modulating means for stepping said unidirectional magnetic field through first and second increments having a fixed ratio and an alternating polarity to modulate said signal, first feedback means responsive to the modulation of said signal for centering the modulation of said unidirectional field with respect to the resonance peak for the sample, second feedback means responsive to the modulation of said signal for adjusting said modulating means inversely as the relaxation time of the sample, and means adjustable by said second feedback means and responsive to modulation of said signal for producing an indication characteristic of the paramagnetic properties of the sample.

13. In magnetic resonance apparatus, the combination comprising means for applying a unidirectional magnetic field to a sample of material, means for applying an alternating magnetic field at substantially the resonance frequency of particular paramagnetic particles in the sample perpendicularly to said unidirectional magnetic field through said sample to produce a signal dependent upon the paramagnetic resonance properties of said particles, adjustable modulating means for stepping said unidirectional magnetic field through first and second increments having a fixed ratio and an alternating polarity to modulate said signal, first feedback means responsive to the modulation of said signal for centering the modulation of said unidirectional field with respect to the resonance peak of said paramagnetic particles, second feedback means responsive to the departure of said modulated signal from a prescribed sequence of relative values for adjusting said modulation substantially as the reciprocal of the relaxation time of said paramagnetic particles, and means adjustable by said second feedback means and responsive to said modulating signal for producing an indication characteristic of the particular paramagnetic particles.

No references cited.

UNITED STATES PATENT OFFICE
CERTIFICATE OF CORRECTION

November 4, 1958

Patent No. 2,859,403

Francois F. Kirchner

It is hereby certified that error appears in the printed specification of the above numbered patent requiring correction and that the said Letters Patent should read as corrected below.

Column 4, line 24, for "audi-amplifier" read -- audio-amplifier --; column 9, line 37, for "$2_1$" read -- $2f_1$ --; line 42, for "atenuator" read -- attenuator --; column 10, line 35, strike out "is", second occurrence; column 11, line 18, for "reasonable" read -- resonance --; column 13, line 43, for "steeping" read -- stepping --.

Signed and sealed this 19th day of May 1959.

(SEAL)
Attest:

KARL H. AXLINE
Attesting Officer

ROBERT C. WATSON
Commissioner of Patents